May 17, 1966   G. H. PARKER   3,251,258
STRINGED INSTRUMENT PROTECTOR
Filed Dec. 4, 1964   4 Sheets-Sheet 1
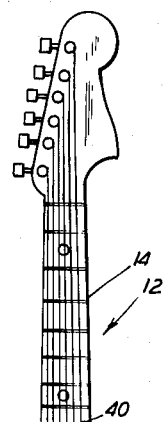
Fig.1
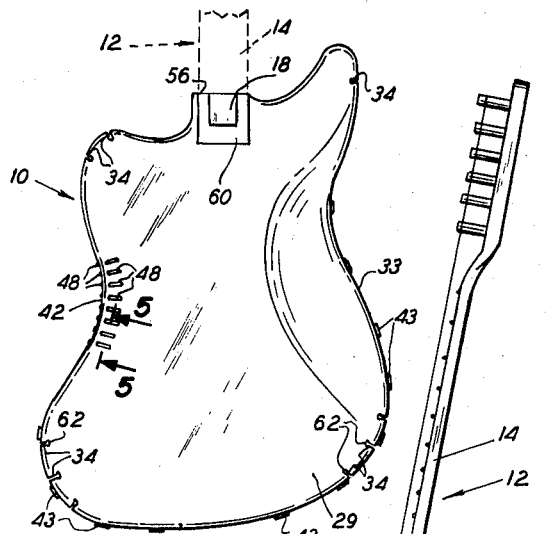
Fig.3
Fig.5
Fig.2
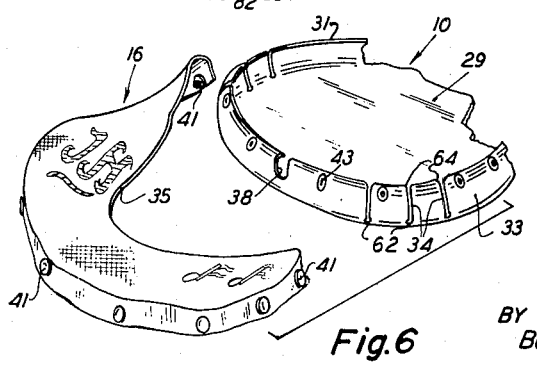
Fig.6
GLEN H. PARKER
INVENTOR
BY BUCKHORN, BLORE, KLARQUIST & SPARKMAN
ATTORNEYS

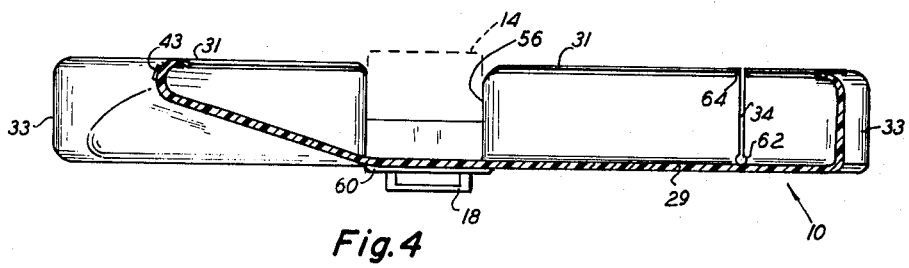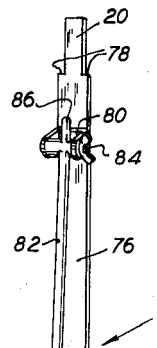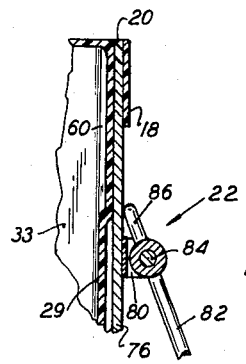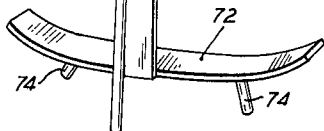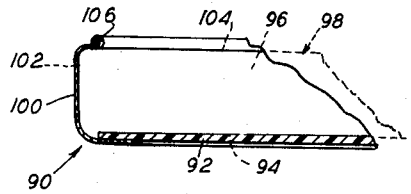

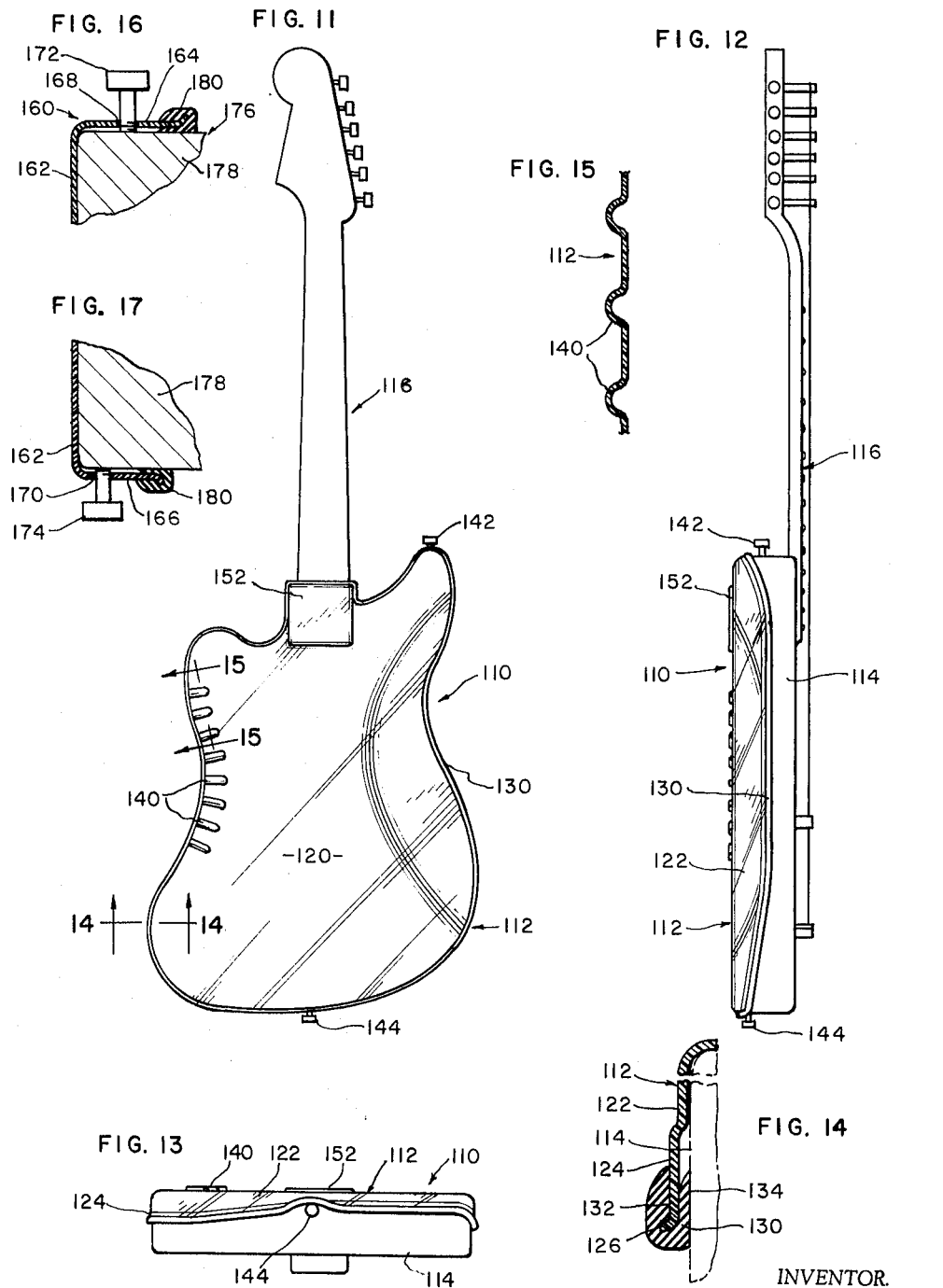

May 17, 1966 G. H. PARKER 3,251,258
STRINGED INSTRUMENT PROTECTOR
Filed Dec. 4, 1964 4 Sheets-Sheet 4

GLEN H. PARKER
INVENTOR
BY
BUCKHORN, BLORE, KLARQUIST & SPARKMAN
ATTORNEYS

United States Patent Office 3,251,258
Patented May 17, 1966

3,251,258
STRINGED INSTRUMENT PROTECTOR
Glen H. Parker, 9125 SW. Rambler Lane,
Portland, Oreg.
Filed Dec. 4, 1964, Ser. No. 417,265
17 Claims. (Cl. 84—453)

This is a continuation-in-part of my co-pending application Serial No. 307,713, now abandoned, filed September 9, 1963, for "Stringed Instrument Protector."

This invention relates to a stringed instrument protector, and more particularly to a protector for an electric guitar.

In stringed instruments generally, and particularly in highly expensive stringed instruments such as, for example, electric guitars, the bodies are often provided with very fine, but easily scratched or marred surfaces. It would be desirable to protect these surfaces during handling thereof, particularly while being used or displayed for sale, to prevent scratches and still have the surfaces visible and appear with their high lustre and fine finishes. It also would be desirable to provide means whereby such expensive instruments may be hung up or otherwise suitably placed for display.

An object of the invention is to provide a stringed instrument protector.

Another object of the invention is to provide a protector for the body of an electric guitar.

Yet another object of the invention is to provide a cover for the body of a stringed instrument which may be inexpensively produced.

A further object of the invention is to provide a cover for the body of a stringed instrument out of transparent material so that the surface of the body can be seen through the cover.

Another object of the invention is to provide a shell-like cover adapted to snap over the body of a stringed guitar and conform closely to the configuration of the body.

Yet another object of the invention is to provide a cover adapted to fit closely over the body of a stringed instrument and having a connector portion adapted to hang the instrument on a display stand or on a peg board for display of the instrument.

A still further object of the invention is to provide a main cover composed of a transparent plastic sheet adapted to fit over the sides and back of the body of a stringed instrument and a supplemental fabric cover which is decorated attached to the edges of the main cover and covering at least a portion of the body of the stringed instrument.

The invention provides a protector for a stringed instrument. The protector includes a main cover which preferably is of plastic material and which has a portion covering the back of the body of a stringed instrument, together with an edge portion covering the periphery of the body. Preferably there also is provided a supplemental fabric cover covering a portion of the front surface of the body and which is connected at the edges thereof to the peripheral portion of the main cover. The main cover also is preferably provided with a connector portion secured to the back thereof, which is adapted to fit over a stand having a suspending portion and a base on which the body of the stringed instrument may rest or to fit over an end of a hook which may be fixed to a wall or a pegboard or the like for display purposes. In a protector forming a specific embodiment of the invention there is provided a main cover formed from a sheet of transparent plastic material into a generally cup-shaped configuration having a back which is complementary to the back of a body of a stringed instrument to be protected, and having a peripheral portion including separate spring fingers adapted to clasp the periphery and front edge portions of the body. An eye connector cemented to the back of the main cover is adapted to be placed over a hook secured to a pegboard or the like to hold the stringed instrument in a position of storage and/or display, and a supplemental fabric cover having decorations thereon is adapted to be snapped onto snaps of the main cover to cover a portion of the front face of the body of the stringed instrument. The main cover also preferably is provided with a roughened portion adjacent a depression therein for holding the cover and the body of an instrument therein against slippage relative to the leg of a musician using the instrument with the instrument resting the body on his leg. In a protector forming an alternate embodiment of the invention, there is provided a back sheet of plastic material covering the back of the body of the instrument, and a fabric sleeve preferably of elastic material is fixed to the back sheet, covers the periphery of the body and holds the back sheet on the body.

A protector forming an alternate embodiment of the invention comprises a shallow, pan-like member shaped to fit the back of a body of a stringed instrument and extend around the portion of the sides of the body adjacent the back. A strip of resilient material is positioned on the rim and grips the body to hold the protector on the instrument. In a modification of this protector, the protector is shaped to cover the back of the body of a stringed instrument and has a pair of tabs having holes therein adapted to fit interlockably over projections on the body to which a supporting strap is to be secured.

A complete understanding of the invention may be obtained from the following detailed description of stringed instrument protectors forming specific embodiments thereof, when read in conjunction with the appended drawings, in which:

FIG. 1 is a front elevation view of a stringed instrument and a protector therefor forming one embodiment of the invention;

FIG. 2 is a side elevation view of the stringed instrument and the protector of FIG. 1;

FIG. 3 is a fragmentary, rear elevation view of the protector of FIG. 1;

FIG. 4 is an enlarged, horizontal sectional view taken along line 4—4 of FIG. 1;

FIG. 5 is an enlarged, fragmentary, vertical sectional view taken along line 5—5 of FIG. 3;

FIG. 6 is an exploded, fragmentary, perspective view of the protector of FIG. 1;

FIG. 7 is an enlarged, perspective view of a display holder of the protector of FIG. 1;

FIG. 8 is an enlarged, vertical sectional view of the protector of FIG. 1;

FIG. 9 is an enlarged, fragmentary, perspective view of a hook on which the protector of FIG. 1 may be suspended to support the stringed instrument carried thereby;

FIG. 10 is a fragmentary, vertical sectional view of a stringed instrument and a protector therefor forming an alternate embodiment of the invention;

FIG. 11 is a rear elevation view of a stringed instrument and a protector therefor forming an alternate embodiment of the invention;

FIG. 12 is a side elevation view of the instrument and protector of FIG. 11;

FIG. 13 is a bottom plan view of the instrument and protector of FIG. 11;

FIG. 14 is an enlarged, fragmentary sectional view taken along line 14—14 of FIG. 11;

FIG. 15 is an enlarged, fragmentary sectional view taken along line 15—15 of FIG. 11;

FIGS. 16 and 17 are fragmentary sectional views of a stringed instrument and a protector therefor forming an alternate embodiment of the invention;

Figure 18:
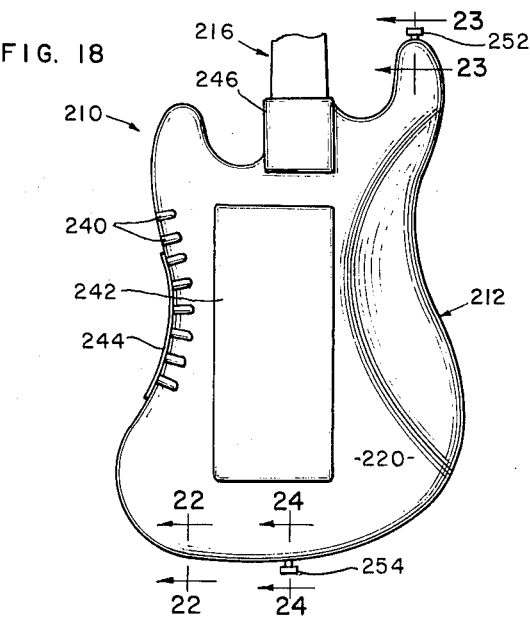
FIG. 18 is a rear elevation view of a stringed instrument and a protector therefor forming an alternate embodiment of the invention.
Figure 19:
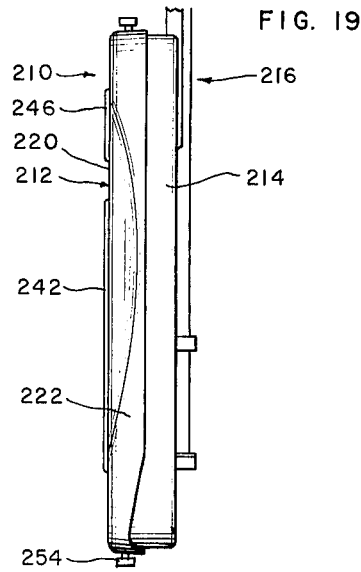
FIG. 19 is a side elevation view of the instrument and protector of FIG. 18.
Figure 21:
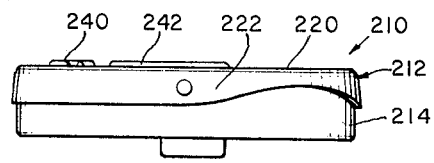
FIG. 21 is a bottom plan view of the protector of FIG. 18.
Figure 20:
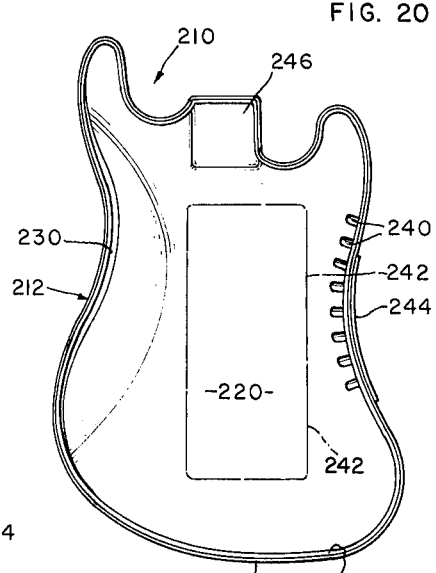
FIG. 20 is a front elevation view of the protector of FIG. 18.
Figure 23:
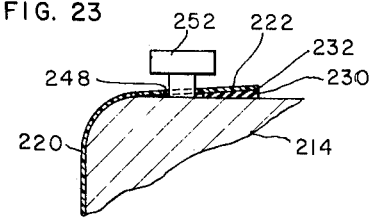
Figure 22:
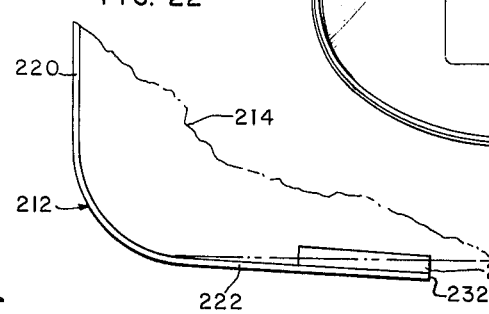
Figure 24:
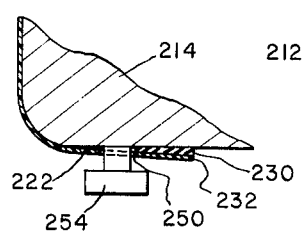

FIG. 22 is an enlarged, fragmentary sectional view take along line 22—22 of FIG. 18; and FIGS. 23 and 24 are enlarged, fragmentary sectional views taken along lines 23—23 and 24—24, respectively, of FIG. 18.

Referring now in detail to the drawings, there is shown therein a cup-shaped main cover 10 which covers the back and peripheral portion of a body 11 of a stringed instrument 12 also having a neck 14, the stringed instrument 12 shown herein being an electric guitar. Attached to the cover 10 is a supplemental front cover 16, and the cover 10 has an eye connector 18 (FIGS. 2, 4 and 8) at its upper end portion which is adapted to slip over either a tank 20 of a display stand or holder 22 or a connector tang 24 (FIG. 9) of a hook 26 having a pin 28 adapted to hook into a pegboard 30 for display or storage of the instrument. The connector 18 is cemented to the cover 10, as are snap fastener members 43 (FIG. 6).

The main cover 10 (FIGS. 1 and 2) fits the back and side periphery of the body 11 of the instrument 12 closely, and is generally cup-shaped to cover these portion of the instrument. The main cover 10 is formed from a known, flexible, plastic compound such as, for example, polyethylene. The main cover preferably is transparent. However, the main cover may be of colored plastic if desired. The cover has a back or bottom 29 and an upper rim 31 which extends partly over the front face 32 of the instrument to hold the main cover in position. The cover 10 has slots 34 in the sides or peripheral portions 33 and the rim to enable the sides to be flexed outwardly so that the cover can be installed and removed from the instrument. The cover also has slots 36 and 38 for projections 37 and 39, respectively, of the instrument which enable a supporting cord or strap (not shown) to be attached directly to the instrument.

The supplemental cover 16 (FIG. 6) may be optionally employed to cover a part of the upper or front surface of the instrument to protect this surface and also to provide color and/or decoration to the instrument, the supplemental cover being, of course, of flexible material such as a fabric or a thin flexible sheet of plastic substantially thinner than the cover 10. The cover 16 has a recess or notch portion 35 to provide clearance for strings 40 (FIG. 1) and tremelo unit 47 of the instrument 12. The supplemental cover 16 and the main cover 10 are provided with complementary snap fastener members 41 and 43, respectively, which are adapted to attach the supplemental cover 16 to the main cover 10. The snap fasteners 41 and 43 are of a known, commercially available type.

The main cover 10 shown is made of a sheet of transparent polyethylene material hot stamped or molded to fit the body of the electric guitar so that the body of the guitar is visible through the cover. The molding is effected after the slots 34, 36 and 38 have been formed in the sheet. The molding step also tapers the sides and rim as illustrated in FIG. 4. The main cover also is provided with a depression or notch 42 adapted to rest on the thigh of a musician using the instrument 12 while in a sitting position. In order to provide a grip and prevent slippage of the instrument on the leg of the musician while the instrument is being played, ribs 48 (FIGS. 3 and 5) are provided, corresponding grooves 50 being formed on the inside of the cover 10. The main cover 10 clasps the body 11 of the instrument 12. The cover 10 has an opening 56 for the neck 14 of the instrument and joint portion 58 of the neck and the body 11. Adjacent the opening 56 there is a slightly dished or recessed portion 60 (FIGS. 3 and 8) contoured to the back of the instrument 12 to receive a correspondingly shaped portion of the body 11 and neck 12 of the instrument.

Each of the slots 34 has a circular inner end portion 62 (FIG. 6) and the walls of the cover have rounded corner portions 64 at the open ends of the slots 34 to avoid sharp corners. The slots 34 are closely spaced to one another at rounded corner portions of the peripheral portion 33 to provide flexibility.

The stand or holder 22 comprises a curved base strip 72 having short supporting legs 74, together with a post 76 having the neck or tang 20 which has at the lower end thereof shoulders 78 (FIG. 7) limiting downward movement of the eye connector 18. A forked bracket 80 mounts a leg 82 pivotally on the back of the post 76, the leg 82 being secured by a bolt 84 pivotally to the bracket 80 and having an upper projection 86 adapted to engage the post 76 and limit pivotal movement of the leg 82 away from the post 76. The display stand or holder 22 is, in effect, a tripod, and the base 72 is curved to fit the bottom end of the instrument 12 with the cover 10 thereon, as illustrated best in FIGS. 1 and 2. The stand 22 mounts the instrument 12 in a secure, readily visible position, and the instrument 12 with the cover 10 may be removed therefrom merely by sliding the eye connector 18 up over the tang 20 of the leg 76, and may be placed on the stand by reversing this procedure.

The cover 10 protects the body 11 of the instrument 12 very effectively and prevents scratches and marring of the surface thereof, while permitting the very fine surface covered thereby to be readily seen even though covered. The cover 10, with the supplemental cover 16, serves to substantially completely protect the most easily damaged portions of the surface of the body 11. The cover 10, with the connector 18, also provides a means of hanging the instrument 12 from the hook 24 (FIG. 9) and provide a ready means of supporting the instrument 12 in a position in which it is not likely to be damaged by users or other people around the instrument during display of the instrument for sale or other storage thereof.

A cover 90 (FIG. 10) forming an alternate embodiment of the invention includes a back sheet 92 of transparent plastic material hot stamped to the shape of back 94 of a body 96 of an instrument 98, which, as shown, is an electric guitar. A sleeve 100 of elastic fabric covers periphery 102 of the body 96 and is adhesively secured at the lower edge portion thereof to the edge portion of the back sheet 92. The upper edge of the sleeve 100 extends over the edge portion of the front face 104 of the body 96 and clasps the body to normally hold the cover on the body, the sleeve being stretchable to permit removal of the cover from the body and attachment of the cover to the body. The upper edge of the sleeve has an elastic strand 106 therein. The sleeve has suitable openings therein for the strap connecting projections of the body of the instrument and also flexes to provide clearance for the neck of the instrument, the sleeve preferably overlapping the front face of the body to a greater extent at the corner portions of the body adjacent the neck to more securely hold the cover on the body. As an alternative, the sleeve may be of non-elastic, flexible fabric and be provided with a drawstring.

A protector 110 (FIGS. 11 to 15) forming an alternate embodiment of the invention comprises a shallow, cup-shaped cover 112 which is shaped to fit on the back and around the portion of the periphery of a body 114 of a stringed instrument 116 adjacent the back, the instrument shown being an electrical guitar. The cover is formed from a plastic sheet of a flexible plastic compound such as, for example, polyethylene, and preferably is transparent. The cover includes a bottom or back portion 120, a wide, close-fitting, continuous, peripheral portion 122, an enlarged or offset, narrow, continuous, rim portion 124 having a flared outer edge 126. The combined widths of the portions 122 and 124 are substantially less than the width of the peripheral portion of the body of the instrument as is illustrated in FIGS. 12 and 13.

An extruded gripping strip or bead 130 of elastic, compressible, gripping material is secured to the rim portion 124 of the cover 112 and extends completely around the cover 112. The strip is generally U-shaped in transverse cross-section as shown in FIG. 14 and has a slit 132 receiving the rim portion 124. The strip may be secured by an adhesive to the rim portion. The strip has a face 134 adapted to frictionally grip the periphery of the body 114 of the instrument to hold the cover 112 tightly on the body 114.

The cover 112 is provided with anti-slip ribs 140 (FIGS. 11 and 15) extending over one side thereof. The side portions 122 and 124 adjacent projections 142 and 144 (FIGS. 11, 12 and 13) of the instrument are narrowed or shallowly notched to provide clearance for the projections while permitting the back or bottom 120 of the cover 112 to fit closely against the back of the instrument. A shallow, recessed portion 152 is provided to receive a complementary portion of the body of the instrument.

A protector 160 (FIGS. 16 and 17) forming an alternate embodiment of the invention includes a cup-shaped cover 162 and is generally similar to the protector 110 except that the cover 162 has peripheral tabs 164 and 166 having holes 168 and 170, respectively, through which strap connecting buttons or projections 172 and 174 screwed into body 178 of stringed instrument 176 project to lock the protector on the body 178 of the instrument. A bead 180 like the bead 130 is provided on the rim of the cover 162. The projections 172 and 174 are of known construction and are threaded and removably screwed into sockets in the body 178. Thus, the projections serve not only their normal function as connectors for the ends of a supporting strap, but also serve to lock the protector on the body 178.

A protector 210 (FIGS. 18 to 23) forming an alternate embodiment of the invention includes a shallow, cup-shaped cover 212 which fits closely on the back and the portion of the periphery of a body 214 of a stringed instrument 216 adjacent the back thereof. The cover is formed from a sheet of a flexible plastic material such as, for example, polyethylene and is shown as being transparent. However, the cover 212 may be opaque and of any desired color. The cover includes a bottom or back portion 220 and a wide, close-fitting, continuous, peripheral portion 222.

A thin, wide gripping strip or band 230 of porous, spongy elastic material such as, for example, polyurethane, is secured by an adhesive such as, for example, a pressure sensitive adhesive, to the inner face of the rim or outer portion of the peripheral portion 222. Preferably the strip extends completely around the periphery and closely grips the adpacent peripheral portion of the body 214. Edge or rim 232 of the transparent cover 212 is preferably colored so as to contrast with the transparent cover to provide a readily visible line to aid in positioning the strip 230 with the outer edge of the strip flush with the edge 232. The strip 230 preferably is of the same color as that of the adjacent portions of the periphery of the body 214 but may be of a different color for decorative purposes.

The cover 212 has anti-slip ribs 240, and may have sheets or patches 242 and 244 of friction material such as cork and rubber or fabric, for example, secured to the back and side of the cover to engage the clothes of the user and prevent slipping relative to the clothes. A shallow, recessed portion 246 is provided to receive a complementary portion of the body of the instrument. The cover has holes 248 and 250 through which strap connecting buttons 252 and 254 extend. It will be readily appreciated that instead of the holes 248 and 250, slits or notches extending to the rim 232 may be provided, and that the strip 230 grips the body of the instrument to hold by itself the cover tightly on the instrument without any holding action of the connecting buttons 252.

The above-described protectors are decorative and protective and are also functional in gripping the adjacent portions of the user. The backs of the covers cling closely to the backs of the instrument bodies and, when the protectors are used on acoustical bodies of acoustical guitars and bases, are believed to reinforce the sounds from these instruments and have the effect of throwing the sounds forward from these instruments. The protectors protects the instruments while on display and during use thereof.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a stringed instrument protector,
a back cover portion of sheet material adapted to fit the back of the body of a stringed instrument, and
resilient clamping means secured to the back cover portion and adapted to grip the periphery of the body of the stringed instrument and retain the back cover portion on the back of the body to protect the body from injuries to the finish thereof.
2. In a stringed instrument protector,
a cup-shaped cover of flexible sheet material adapted to fit the back and peripheral portion of the body of a stringed instrument,
the peripheral portion of the cover having transverse slots therein to divide the peripheral portion of the cover into a plurality of flexible strips pressing against the periphery of the body.
3. The protector of claim 2 wherein there is provided rim portions extending from the strips of the cover and overhanging the front face of the body.
4. A one-piece protector for a stringed instrument comprising,
a sheet of flexible plastic material pressed into the form of a cup having a bottom portion complementary to the back surface of a body of a stringed instrument and also having separate side wall portions complementary to the peripheral portion of the body,
the sheet also having overhanging lip portions extending from the side wall portions and adapted to engage the front of the body and retain the sheet on the body.
5. In a protector for a stringed instrument,
a cup-shaped cover of flexible, plastic sheet material of a shape complementary to the back and periphery of a body of a stringed instrument and also having a rim portion adapted to overhang the front face of the body,
the cover having slots in the peripheral portion thereof extending from the bottom thereof to the rim to separate the periphery and rim into a plurality of flexible, clasping portions covering the periphery of the body.
6. The protector of claim 5 wherein the clasping portions are tapered.
7. In a protector for an electric guitar having a body, a neck and strap connectors projecting from the periphery of the body, a back portion of sheet material adapted to fit the back of the body of such a guitar, and a periphery portion adapted to cover the periphery of the body and secure the back portion to the body, the periphery portion having openings for the neck and the strap connectors of the guitar.

8. In a protector for an electric guitar having a body, a neck and strap connectors projecting from the periphery of the body, a back portion of sheet material adapted to fit the back of the body of such a guitar, a periphery portion adapted to cover the periphery of the body and secure the back portion to the body, the periphery portion having openings for the neck and the strap connectors of the guitar, and an eye connector secured to the outside of the back portion near one end thereof.

9. In a protector for an electric guitar, support means having a connector member, and a plastic cover adapted to hold the body of an electric guitar and having a connector portion adapted to releasably interlock with the connector member of the support means to support the cover and the guitar.

10. In a protector for an electric guitar, a tripod display stand having an unpwardly projecting member and a rounded base strip, and a plastic cover adapted to hold the body of an electric guitar, the bottom of the cover and the top of the base strip being complementary in shape, the cover having an eye connector adapted to releasably interlock with the upwardly projecting member to hold the cover and the guitar on the stand with the cover resting on the base strip.

11. In a protector for a stringed instrument, a back sheet of plastic material adapted to cover the back of a body of a stringed instrument, and a sleeve of flexible fabric material secured at one end to the back sheet and adapted to cover the periphery of such a body.

12. The protector of claim 11 wherein the sleeve is of elastic material having a lip portion adapted to overhang the front face of the body of the stringed instrument.

13. The protector of claim 11 wherein the back sheet is molded to conform to the shape of the back of the body of the stringed instrument.

14. In a protector for a stringed instrument, a sheet of flexible plastic material shaped into the form of a cup having a bottom portion complementary to the back surface of a body of a stringed instrument and also having a peripheral wall portion clasping the peripheral portion of the body of the instrument.

15. In a protector for a stringed instrument, a cup-shaped cover adapted to fit against the back of the body of a stringed instrument and having a narrow peripheral portion fitting around only the portion of the periphery of the body which is adjacent the back thereof, and a bead of elastic material fitting on the rim of the cover and gripping the periphery of the body.

16. The protector of claim 15 wherein the cover has a pair of tabs having holes through which project strap connectors of the instrument.

17. In a protector for a stringed instrument, a one-piece, plastic sheet cup-shaped member adapted to fit on the back of and the portion of the periphery adjacent the back of a body of a stringed instrument, and a strip of resilient material secured to the inner face of the rim portion of the cup-shaped member adapted to grip the periphery of the body of the stringed instrument.

References Cited by the Examiner

UNITED STATES PATENTS 1,207,678  12/1916  Bolander _____ 84—294

LOUIS J. CAPOZI, *Primary Examiner.*